(12) United States Patent
Xu

(10) Patent No.: US 12,032,975 B2
(45) Date of Patent: Jul. 9, 2024

(54) PICTURE DISPLAY METHOD AND APPARATUS, ELECTRONIC DEVICE, AND MEDIUM

(71) Applicant: VIVO MOBILE COMMUNICATION CO., LTD., Dongguan (CN)

(72) Inventor: Kai Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/723,428

(22) Filed: Apr. 18, 2022

(65) Prior Publication Data

US 2022/0300704 A1 Sep. 22, 2022

Related U.S. Application Data

(63) Continuation of application No. PCT/CN2020/123341, filed on Oct. 23, 2020.

(30) Foreign Application Priority Data

Oct. 29, 2019 (CN) .......................... 201911039400.2

(51) Int. Cl.
*G06F 17/00* (2019.01)
*G06F 9/451* (2018.01)
(Continued)

(52) U.S. Cl.
CPC .............. *G06F 9/451* (2018.02); *G06F 40/18* (2020.01); *G06T 7/11* (2017.01); *G06V 30/19* (2022.01);
(Continued)

(58) Field of Classification Search
CPC ............ G06F 40/18; G06F 2203/04806; G06F 3/0481; G06F 3/04845; G06T 7/11; G06T 2207/20021; G06V 30/19; G06V 30/412
(Continued)

(56) References Cited

U.S. PATENT DOCUMENTS 7,640,516 B2 * 12/2009 Atkins .................... G06T 11/60
715/713
7,788,579 B2 * 8/2010 Berkner ................ G06F 40/106
715/204
(Continued)

FOREIGN PATENT DOCUMENTS

CN 102567300 A 7/2012
CN 102890827 A 1/2013
(Continued)

OTHER PUBLICATIONS

Chen, Detecting Web Page Structure for Adaptive Viewing on Small Form Factor Devices, ACM, 2003 (Year: 2003).*
(Continued)

*Primary Examiner* — Matthew Ell
*Assistant Examiner* — Matthew J Ludwig
(74) *Attorney, Agent, or Firm* — IPX PLLC

(57) ABSTRACT

A picture display method, an apparatus, and a medium are provided. The picture display method includes: obtaining a first picture, and the first picture including a first region and a second region arranged in a first direction; and displaying a second picture when a first size of the first picture in the first direction satisfies a predetermined condition, and the second picture including the first region and the second region arranged in a second direction.

16 Claims, 9 Drawing Sheets

(51) Int. Cl.
  *G06F 40/18* (2020.01)
  *G06T 7/11* (2017.01)
  *G06V 30/19* (2022.01)
  *G06V 30/412* (2022.01)

(52) U.S. Cl.
  CPC .............. *G06V 30/412* (2022.01); *G06T 2207/20021* (2013.01); *G06T 2207/30176* (2013.01)

(58) Field of Classification Search
  USPC ........................... 715/212, 243, 788
  See application file for complete search history.

(56) References Cited

U.S. PATENT DOCUMENTS

| | | | | |
|---|---|---|---|---|
| 8,665,294 | B2* | 3/2014 | Hirooka | G06F 40/103 |
| | | | | 715/764 |
| 9,152,292 | B2* | 10/2015 | Xiao | G06F 3/0481 |
| 9,307,115 | B2* | 4/2016 | Hasegawa | H04N 1/3876 |
| 9,348,801 | B2* | 5/2016 | Oliveira | G06F 40/106 |
| 9,396,167 | B2* | 7/2016 | Doll | G06F 40/106 |
| 9,460,089 | B1* | 10/2016 | Rathod | G06F 40/58 |
| 10,089,490 | B2* | 10/2018 | Terada | G06F 21/6245 |
| 10,127,221 | B2* | 11/2018 | Zaric | G06F 40/106 |
| 10,438,567 | B2* | 10/2019 | Chai | G09G 5/227 |
| 10,459,670 | B2* | 10/2019 | Lewis | G06K 15/1868 |
| 11,144,777 | B2* | 10/2021 | Kimura | H04N 1/387 |
| 11,189,001 | B2* | 11/2021 | Kim | G09G 5/395 |
| 11,539,949 | B2* | 12/2022 | Deng | H04N 19/11 |
| 2010/0174985 | A1* | 7/2010 | Levy | G06F 40/106 |
| | | | | 715/244 |
| 2011/0075220 | A1* | 3/2011 | Chiba | G06K 15/1822 |
| | | | | 358/1.18 |
| 2011/0283228 | A1* | 11/2011 | Hiraiwa | G06F 3/0481 |
| | | | | 715/808 |
| 2013/0016121 | A1* | 1/2013 | Azuchi | G06F 3/1253 |
| | | | | 345/619 |
| 2014/0310122 | A1 | 10/2014 | Danielson et al. | |
| 2015/0254804 | A1* | 9/2015 | Hasegawa | G06V 30/153 |
| | | | | 345/660 |
| 2017/0031868 | A1* | 2/2017 | Elings | G06F 40/103 |
| 2018/0088748 | A1* | 3/2018 | Ozer | G06F 3/0481 |
| 2019/0147026 | A1* | 5/2019 | Jon | G06F 40/171 |
| | | | | 715/230 |

FOREIGN PATENT DOCUMENTS

| | | | |
|---|---|---|---|
| CN | 106603838 | A | 4/2017 |
| CN | 106649639 | A | 5/2017 |
| CN | 107608606 | A | 1/2018 |
| CN | 108460769 | A | 8/2018 |
| CN | 109388726 | A | 2/2019 |
| CN | 109544455 | A | 3/2019 |
| CN | 110865859 | A | 3/2020 |

OTHER PUBLICATIONS

Kaur, Histogram Equalization Tool: Brightness Preservation and Contrast Enhancement using Segmentation with Opening-by-Reconstruction, Institute Journal of Computer Applications, 2015 (Year: 2015).*

Extended European Search Report issued in related European Application No. 20883100.8, mailed Nov. 18, 2022, 8 pages.

International Search Report issued in corresponding International Application No. PCT/CN2020/123341, mailed Jan. 26, 2021, 4 pages.

First Office Action issued in related Chinese Application No. 201911039400.2, mailed Mar. 1, 2021, 11 pages.

* cited by examiner

S102, Obtain a first picture, and the first picture including a first region and a second region arranged in a first direction

S104, Display a second picture if a first size of the first picture in the first direction satisfies a predetermined condition, and the second picture including the first region and the second region arranged in a second direction. The second direction may be a direction perpendicular to the first direction

FIG. 2

| Himalayas (Sanskrit: hima alaya, meaning land of snow), | — Sub-picture 1

| which means "homeland of snow" in Tibetan, are located on the southern edge | — Sub-picture 2

Vertical direction

| of the Qinghai-Tibet Plateau, and the Himalayas are the highest mountains in the world | — Sub-picture 3

| with more than 110 peaks reaching or exceeding 7,350 meters above sea level, and are | — Sub-picture 4

| also the natural boundary between East Asia and South Asia. | — Sub-picture 5

|  | — Sub-picture 6

FIG. 9

PICTURE DISPLAY METHOD AND APPARATUS, ELECTRONIC DEVICE, AND MEDIUM

CROSS-REFERENCE TO RELATED APPLICATION

This application is a bypass continuation of PCT Application No. PCT/CN2020/123341, filed Oct. 23, 2020, which claims priority to Chinese Patent Application No. 201911039400.2, filed Oct. 29, 2019 in China, both of which are incorporated herein by reference in its entirety.

TECHNICAL FIELD

Embodiments of the present disclosure relate to the field of terminal, and in particular, to a picture display method and apparatus, an electronic device, and a medium.

BACKGROUND

With the rapid development of Internet technologies, electronic devices (such as a mobile phone, an iPad, and the like) have become a daily necessity for people. In daily work and life, electronic devices bring great convenience to users, for example, a user may view pictures by using an electronic device.

When an electronic device is used to display a picture, if the picture is too small and the user cannot clearly see the content of the picture, the picture needs to be enlarged for display. However, when the picture is enlarged, in order to view the content in different positions of the picture, the user needs to constantly change a sliding direction when sliding to view the content in different positions, which is very troublesome to operate.

SUMMARY

Embodiments of the present disclosure provide a picture display method and apparatus, an electronic device, and a medium to resolve the problem of cumbersome operations in viewing pictures by the user.

According to a first aspect, an embodiment of the present disclosure provides a picture display method, applied to an electronic device, and the method includes:
  obtaining a first picture, and the first picture including a first region and a second region arranged in a first direction; and
  displaying a second picture if a first size of the first picture in the first direction satisfies a predetermined condition, and the second picture including the first region and the second region arranged in a second direction.

According to a second aspect, an embodiment of the present disclosure provides a picture display apparatus, and the apparatus includes:
  a first picture obtaining module, configured to obtain a first picture, and the first picture including a first region and a second region arranged in a first direction; and
  a first picture display module, configured to display a second picture if a first size of the first picture in the first direction satisfies a predetermined condition, and the second picture including the first region and the second region arranged in a second direction.

According to a third aspect, an embodiment of the present disclosure provides an electronic device, including a processor, a memory, and a computer program that is stored in the memory and that can run on the processor, and when the computer program is executed by the processor, steps of the picture display method are implemented.

According to a fourth aspect, an embodiment of the present disclosure provides a computer-readable storage medium, where the computer-readable storage medium stores a computer program, and when the computer program is executed by a processor, steps of the picture display method are implemented.

In the embodiments of the present disclosure, as for the first picture to be displayed, the first picture includes the first region and the second region arranged in the first direction; and if the first size of the first picture in the first direction satisfies the predetermined condition, the second picture is displayed, and the second picture includes the first region and the second region arranged in the second direction. The first picture is not directly displayed according to the embodiments of the present disclosure, but an arrangement mode of the first region and the second region on the first picture is changed to display the first picture. The user does not need to slide in the first direction to view the second picture, which reduces directions of the user to slide, thereby facilitating the user to view the picture and simplifying steps for the user to view the picture.

BRIEF DESCRIPTION OF DRAWINGS

The present disclosure may be better understood from the following descriptions of specific implementations of the present disclosure with reference to the accompanying drawings that same or similar reference numerals represent same or similar features in the present disclosure.

FIG. 2 is a schematic flowchart of a picture display method according to an embodiment of the present disclosure;

FIG. 9 is a schematic diagram of subpicture arrangement according to an embodiment of the present disclosure;

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
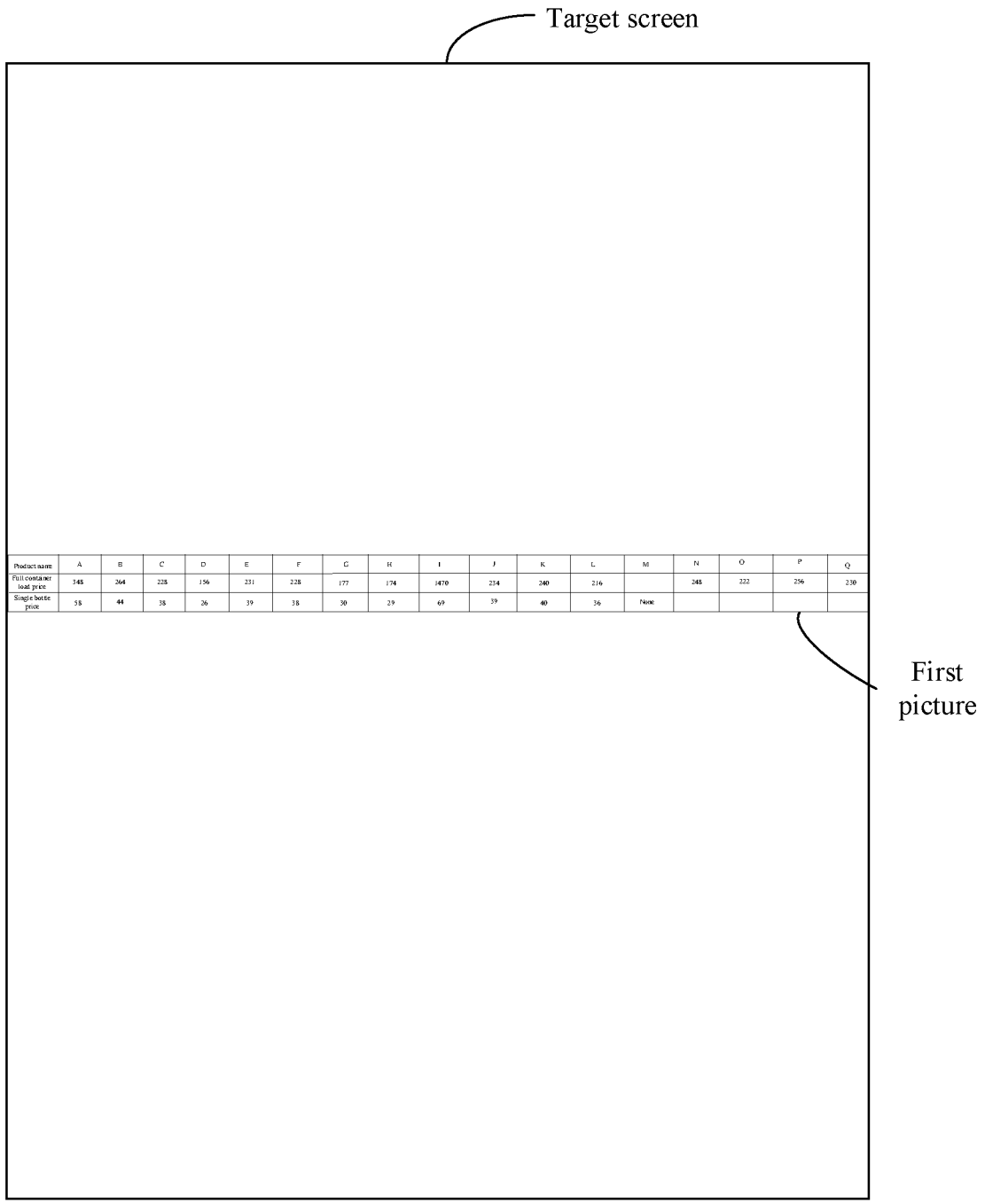
FIG. 1 is a schematic diagram of displaying a first picture according to the prior art.

Referring to FIG. 1, a first picture is a picture obtained by taking a screenshot of a table, and the picture is a long strip picture. When the first picture is displayed on a target screen, a length of the first picture is relatively long, content of the first picture cannot be clearly displayed when the entire first picture is displayed, so the first picture needs to be enlarged. When the first picture is enlarged, it is necessary to slide left and right to view the entire content of the picture, which is very troublesome for the user to operate. In view of this scenario, an embodiment of the present disclosure provides a picture display method.

FIG. 2 is a schematic flowchart of a picture display method according to an embodiment of the present disclosure. As shown in FIG. 2, the picture display method includes:

S102, Obtaining a first picture, and the first picture including a first region and a second region arranged in a first direction.

The first picture includes at least two regions arranged in the first direction, and the at least two regions include the first region and the second region.

As shown in FIG. 2, the picture display method further includes:

S104, Displaying a second picture if a first size of the first picture in the first direction satisfies a predetermined condition, and the second picture including the first region and the second region arranged in a second direction. The second direction may be a direction perpendicular to the first direction.

As an example, the predetermined condition includes that the first size is greater than a predetermined threshold.

As another example, the predetermined condition includes that a quotient of the first size and a second size of the first picture in the second direction is greater than a second predetermined threshold. For example, the second predetermined threshold is 6.

The second predetermined threshold may be determined by a size of the target screen. For example, if the target screen is a display screen of a mobile phone, then the size of the target screen is relatively small, and the second predetermined threshold is 4; and if the target screen is a display screen of a tablet computer, then the size of the target screen is relatively large, and the second predetermined threshold is 6.

The second predetermined threshold may also be manually set, such as setting according to an empirical value.

In the embodiments of the present disclosure, for the first picture to be displayed, the first picture includes the first region and the second region arranged in the first direction; and if the first size of the first picture in the first direction satisfies the predetermined condition, the second picture is displayed, and the second picture includes the first region and the second region arranged in the second direction. The first picture is not directly displayed according to the embodiments of the present disclosure, but an arrangement mode of the first region and the second region on the first picture is changed to display the first picture. The user does not need to slide in the first direction to view the second picture, which reduces directions of the user to slide, thereby facilitating the user to view the picture and simplifying steps for the user to view the picture.

Figure 3:
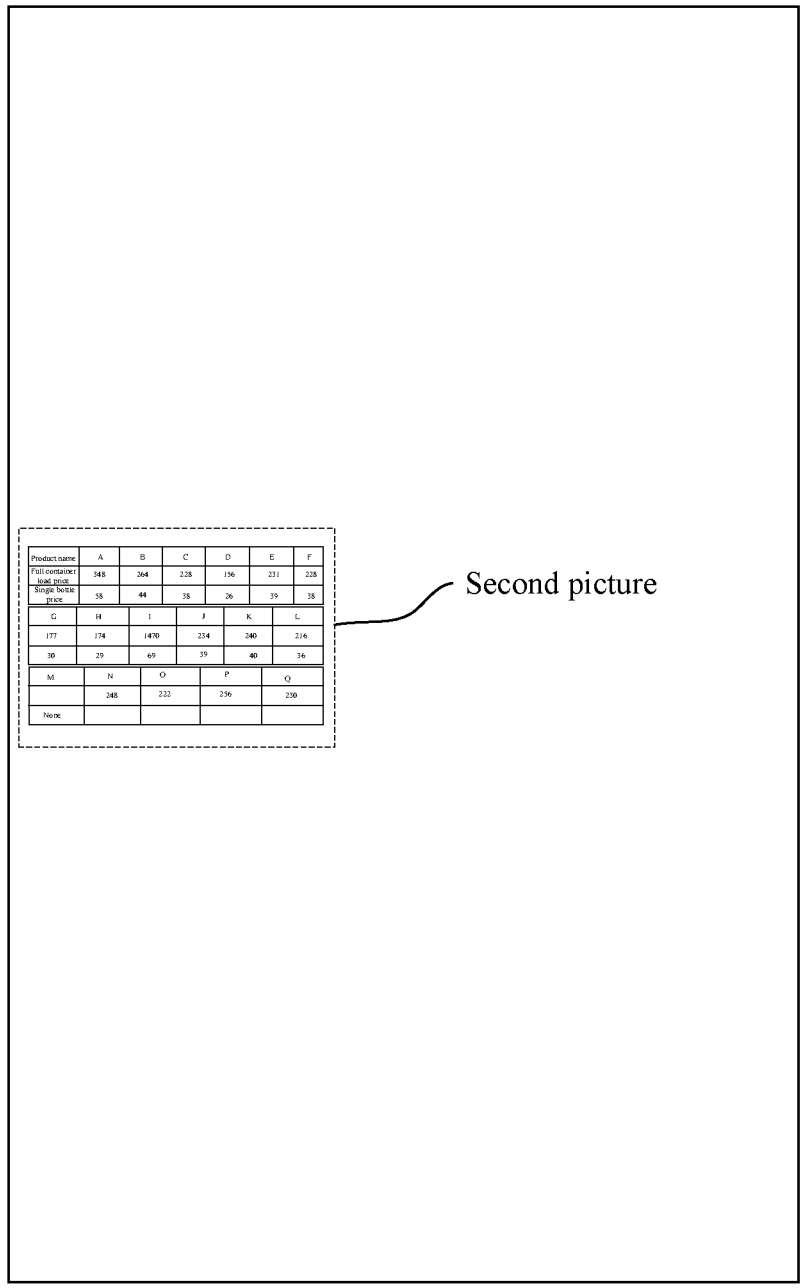
FIG. 3 is a schematic diagram of picture display according to a first embodiment of the present disclosure.

For example, for the first picture in FIG. 1, the second picture shown in FIG. 3 is obtained by rearranging the first picture, and the second picture is displayed. When the user views the second picture, the entire content of the second picture may be viewed without continually sliding left and right, which is convenient for the user to operate.

In an embodiment of the present disclosure, after the first picture is obtained and before the second picture is displayed, the picture display method further includes: splitting the first picture, and regions obtained from the splitting include at least the first region and the second region arranged in the first direction.

In an embodiment of the present disclosure, the displaying a second picture includes:
displaying the second picture on a target screen, and at least one direction of the target screen being covered with the second picture.

In this embodiment of the present disclosure, at least one direction on the target screen is covered with the second picture, such that a size of the content in the second picture is larger than a size of content in the first picture, thereby facilitating the user to clearly view the content of the second picture. In some cases, the size of the content in the second picture is relatively large, and the user does not need to manually enlarge the second picture.

Figure 4:
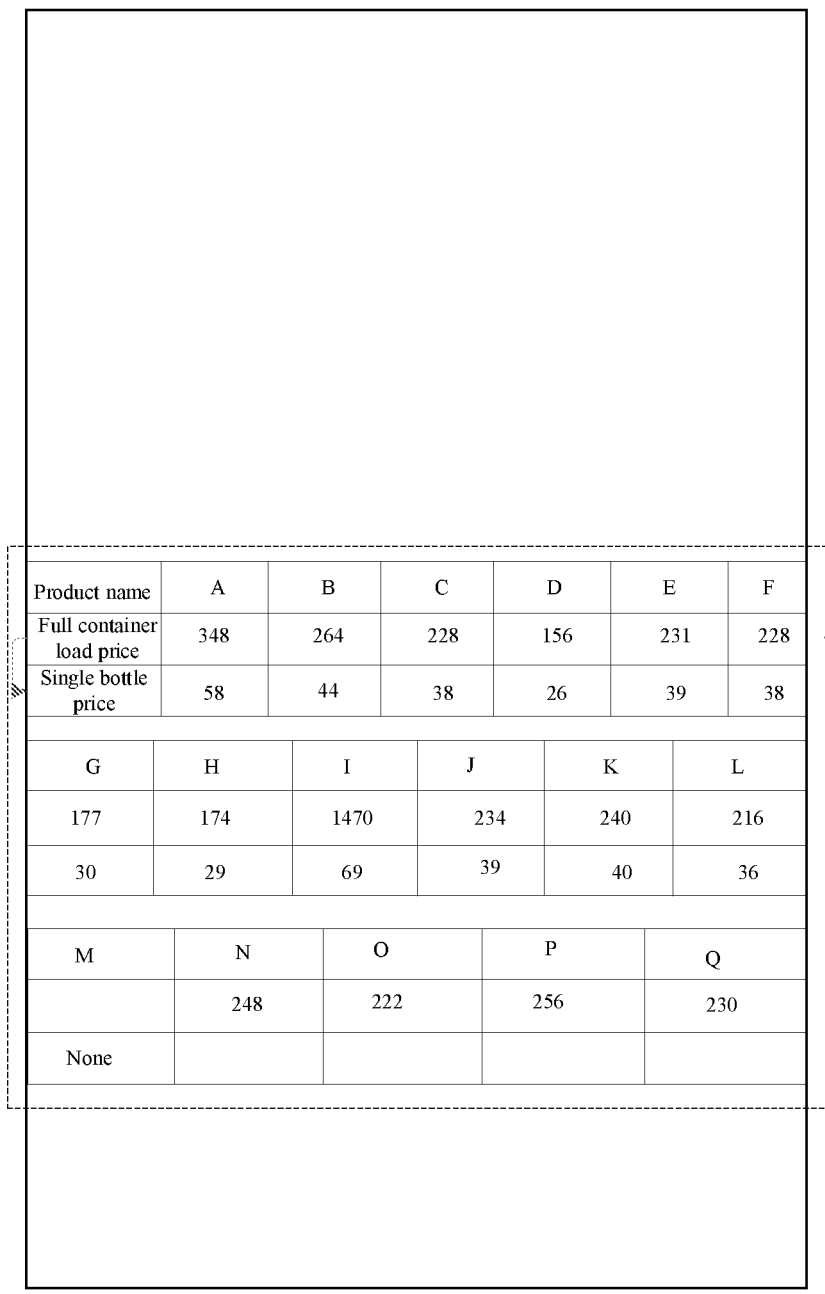
FIG. 4 is a schematic diagram of picture display according to a second embodiment of the present disclosure.

For example, referring to FIG. 1, if the first picture is displayed according to the prior art, the size of the content displayed in the first picture is very small, which is difficult for the user to see clearly. In order to see the content of the first picture clearly, the user needs to enlarge the first picture. However, when the first picture is enlarged, not all the content in the first picture can be displayed, and the user needs to slide left or right to display all the content in the first picture. According to the embodiments of the present disclosure, referring to FIG. 4, three regions horizontally arranged in the first picture are rearranged in a vertical direction in the second picture, and they are expanded horizontally to the full extent of the horizontal direction of the second picture. As a result, all price information of a product A to a product Q in the first picture is displayed to the user in the second picture. Product A to Product Q can be different types of wine, and users can quickly access information on the same screen, making it easy for users to compare prices of various products and improving the user experience.

In an embodiment of the present disclosure, before displaying a second picture, the picture display method further includes:
splitting the first picture into at least two subpictures, the at least two subpictures including a first subpicture and a second subpicture, the first subpicture including the first region, the second subpicture including the second region, and a size of each of the subpictures in the first direction being smaller than the first size; and
using the at least two subpictures as the second picture; or splicing the at least two subpictures in the second direction to obtain the second picture.

In this embodiment of the present disclosure, the at least two subpictures are obtained by splitting the first picture, and the at least two subpictures obtained by splitting are arranged and displayed in the second direction. The displayed second picture is more in line with a habit of viewing pictures of the user, such that the displayed second picture may bring a better visual effect to the user.

In an embodiment of the present disclosure, splitting the first picture into at least two subpictures includes:
determining, based on a first size of the first picture in a first direction, a quantity N of subpictures to be obtained from splitting, where N is a positive integer;

determining a target split position based on the quantity N of the subpictures and the first size; and splitting the first picture at the target split position.

In this embodiment of the present disclosure, the split position of the first picture is determined by the size of the first picture in the first direction. If the first size of the first picture in the first direction is too large, there may be more split positions, namely, more splits, such that the size of the arranged subpicture is more normal.

In an embodiment of the present disclosure, determining a target split position based on the quantity N of the subpictures and the first size includes:

determining an N equal split position of the first picture in the first direction based on the quantity N of the subpictures and the size of the first direction, and using the N equal split position as a reference split position.

As an example, a quotient of the size of the first direction and N is calculated, the quotient is used as a single split length, the N equal position is determined based on the single split length, and a distance between two adjacent positions in the N equal positions is the single split length. That is, a purpose of splitting the first picture equally is achieved.

In an embodiment of the present disclosure, determining a target split position based on the quantity N of the subpictures and the first size includes:

determining an N equal split position of the first picture in the first direction based on the quantity N of the subpictures and the size of the first direction, and using the N equal split position as a reference split position; in a case that there is text in the reference split position, obtaining a text gap position adjacent to the text and using the text gap position as the target split position.

In this embodiment of the present disclosure, if there is text at the reference split position, and splitting is performed at the reference split position, the text is also split, which affects the user to view. Therefore, splitting is performed at the text gap position, so as to avoid splitting text into two parts and affecting the user to view.

The following describes picture splitting in the embodiments of this application through several examples.

Figure 5:
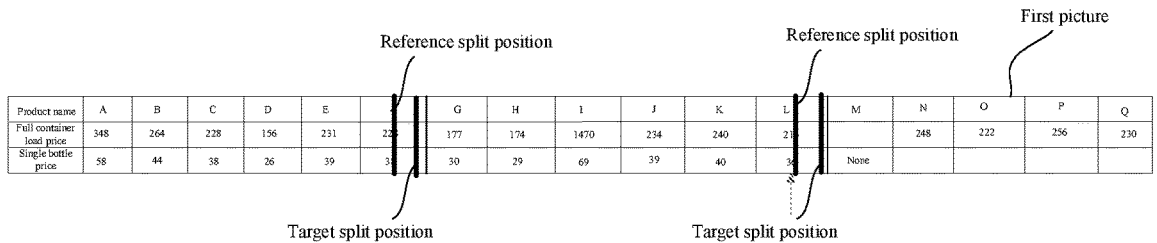
FIG. 5 is a schematic diagram of picture splitting according to a first embodiment of the present disclosure.

For example, referring to FIG. 5, the first picture is a picture including a table, the reference split position is a position where the first picture is divided into N equal parts, there is text in the reference split position (namely, numbers and letters), the text gap position is used as the target split position, and splitting is performed at the target split position.

Figure 6:
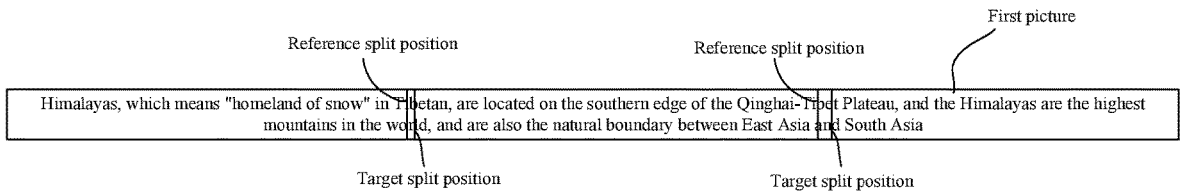
FIG. 6 is a schematic diagram of picture splitting according to a second embodiment of the present disclosure.

For another example, referring to FIG. 6, the first picture is a picture including a line of text, the reference split position is a position where the first picture is divided into N equal parts, there is text in the reference split position, text adjacent to the text is obtained, a gap between the text in the reference split position and the text adjacent is used as the target split position, and splitting is performed at the target split position.

In an embodiment of the present disclosure, determining a target split position based on the quantity N of the subpictures and the first size includes:

determining an N equal split position of the first picture in the first direction based on the quantity N of the subpictures and the first size, and using the N equal split position as a reference split position; and in a case that there is a separator identified through a technology such Optical Character Recognition (OCR) having a distance from the reference split position less than a first predetermined threshold, using a location of the separator as the target split position.

The separator may be a frame line in the vertical direction of the table, or a predetermined punctuation, for example, a period or a comma.

In this embodiment of the present disclosure, if there is a separator near the reference split position, the splitting is performed at the location of the separator, so as to avoid separating related content between two adjacent separators as far as possible. In this way, even if the first picture is split, it may be convenient for the user to view the content of the picture.

The following describes picture splitting in the embodiments of this application through an example.

Figure 7:
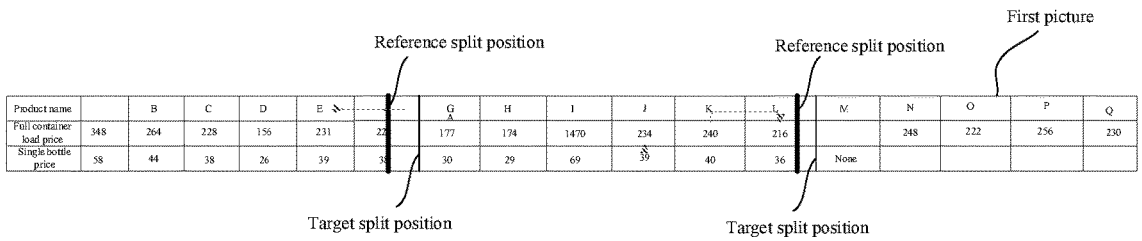
FIG. 7 is a schematic diagram of picture splitting according to a third embodiment of the present disclosure.

For example, referring to FIG. 7, the first picture is a picture including a table, and the separator is a frame line in the vertical direction of the table. If there is a frame line whose distance from the reference split position is smaller than the first predetermined threshold value among frame lines in the vertical direction, the frame line is used as the target split position. If there is no frame line whose distance from the reference split position is smaller than the first predetermined threshold among the frame lines in the vertical direction, splitting is performed at the reference split position.

In an embodiment of the present disclosure, identifying a separator in the first picture includes: identifying the table in the first picture, and using a frame line in the second direction of the table as the separator.

The determining, based on the first size, a quantity N of subpictures to be obtained from splitting includes:

determining a distance between every two adjacent separators, where the distance between every two adjacent separators is equal; calculating a first quotient of a size of the target screen in the first direction and the distance between every two adjacent separators; and using a value obtained by rounding the first quotient as the quantity N of the subpictures.

In an embodiment of the present disclosure, determining, based on the first size, a quantity N of subpictures to be obtained from splitting includes:

calculating a second quotient of the first size and a size of the target screen in the first direction; and using a value obtained by rounding the second quotient as the quantity N of the subpictures. If the value obtained by rounding the second quotient is less than 2, the quantity N of the subpictures is 2. The rounding includes rounding off, rounding up, and rounding down. Rounding up: regardless of rounding rules, as long as there is a non-zero number after a decimal point, the preceding integer will be added by 1; Rounding down: regardless of rounding rules, numbers after the decimal point are ignored.

In an embodiment of the present disclosure, before the displaying a second picture, the picture display method further includes:

splitting the first picture into at least two subpictures based on a preset quantity M of splits, the at least two subpictures including a first subpicture and a second subpicture, the first subpicture including the first region, the second subpicture including the second region, a size of each of the subpictures in the first direction being smaller than the first size, and M being a positive integer; arranging the at least two subpictures in the second direction; synthesizing the at least two subpictures based on the at least two arranged subpictures to obtain a synthesized picture; and updating a value of M in a case that a size of the synthesized picture in the first direction satisfies the predetermined condition, setting M=M+K, K being a positive integer, and re-splitting the first picture until the size of the synthesized picture does not satisfy the predetermined condition.

The following describes picture splitting in the embodiments of this application through an example.

For example, the first picture is split once to obtain 2 subpictures based on the preset quantity of splits M=1, the 2 subpictures are arranged, and the arranged 2 subpictures are synthesized to obtain a synthesized picture. If a size of the synthesized picture in the first direction satisfies the predetermined condition, indicating that the quantity of splits is relatively small, the quantity of splits needs to be increased, where M=1+1. The first picture is re-split, and the first picture is split twice. By analogy, until the size of the synthesized picture in the first direction does not satisfy the predetermined condition. If the predetermined condition is not satisfied, indicating that the size of the synthesized picture in the first direction is normal, then splitting is stopped, and a last obtained synthesized picture is used as the second picture.

In an embodiment of the present disclosure, splitting the first picture into at least two subpictures includes:
 identifying a plurality of lines or columns of text in the first picture; and
 splitting the first picture into the at least two subpictures according to the plurality of lines or columns of text, where each of the subpictures includes at least one line or one column of text fragment.

The following describes how to arrange the at least two subpictures in the second direction in two cases (namely, a case that the first picture includes a plurality of lines of text and a case that the first picture includes a plurality of columns of text).

1. If the first picture includes a plurality of lines of text, the arranging the at least two subpictures in the second direction includes:
 arranging, in the second direction, subpictures respectively corresponding to the plurality of lines of text based on a line order of the text in the first picture; and for a plurality of text fragments in a same line, arranging subpictures respectively corresponding to the plurality of text fragments based on an order of the plurality of text fragments in the same line.

The following uses an example to describes how to arrange at least two subpictures in the second direction in a case that the first picture includes a plurality of lines of text.

Figure 8:
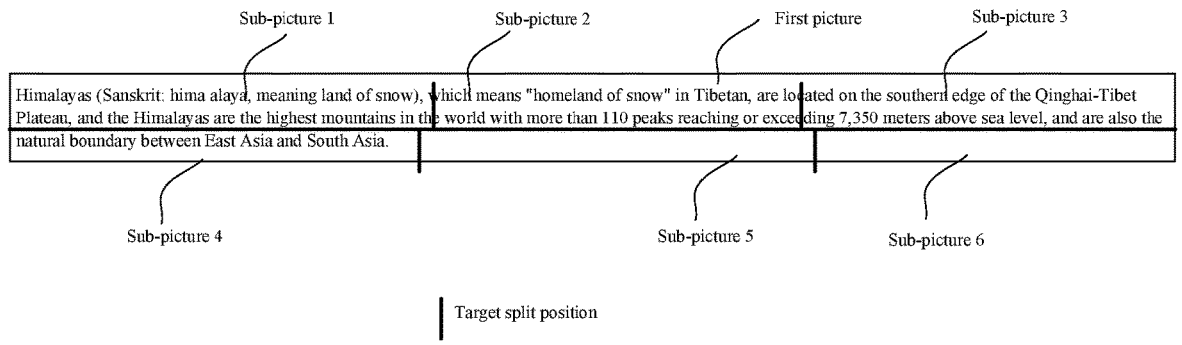
FIG. 8 is a schematic diagram of picture splitting according to a fourth embodiment of the present disclosure.

For example, referring to FIG. 8, the first picture includes two lines of text, and a first line of text is split into three text segments, where a subpicture 1 includes a left segment of the first line of text, a subpicture 2 includes a middle segment of the first line of text, and a subpicture 3 includes a right fragment of the first line of text. A second line of text is split into three text segments, where a subpicture 4 includes a left segment of the second line of text, a subpicture 5 includes a middle segment of the second line of text, and a subpicture 6 includes a right fragment of the second line of text.

Referring to FIG. 9, in the vertical direction, the subpictures for the first row are arranged first, and then the subpictures for the second row are arranged according to the row order of the text in the first picture. When the subpictures for the first row are arranged, a subpicture 1, a subpicture 2, and a subpicture 3 are arranged in order, and when the subpictures for the second row are arranged, a subpicture 4, a subpicture 5, and a subpicture 6 are arranged in order.

In addition, whether each subpicture has content may be identified, and if there is no content in the subpicture, the subpicture with no content may be deleted. For example, in FIG. 8, if the subpicture 6 has no content, the subpicture 6 is deleted, and the subpicture 6 may not participate in the arrangement of the subpictures.

As an example, arranging the subpictures of the plurality of lines of text in the first picture specifically includes:
 dividing subpictures split from a same line of text into a same group to obtain a plurality of groups of subpictures; and performing the following operations on the plurality of groups of subpictures based on a top-to-bottom order of each of the plurality of groups of subpictures in the first picture: Step A: arranging subpictures of a first group from top to bottom based on a left-to-right order of the subpictures of the first group in the plurality of groups of subpictures (namely, subpictures of the first line of text) in the first picture; Step B: performing a picture arrangement operation: based on a left-to-right order of subpictures of an $i^{th}$ group in the plurality of groups of subpictures in the first picture, arranging a first subpicture of the $i^{th}$ group below a last subpicture of an $i-1^{th}$ group, and arranging a $j^{th}$ subpicture of the $i^{th}$ group below a $j-1^{th}$ subpicture of the $i^{th}$ group until all subpictures of the $i^{th}$ group are arranged, where i and j are integers greater than 1; and step C: i=i+1, returning to step B until a last group of subpictures in the plurality of groups of subpictures are arranged.

2. If the first picture includes a plurality of columns of text, the arranging the at least two subpictures in the second direction includes:
 arranging, in the second direction, subpictures respectively corresponding to the plurality of columns of text based on a column order of the text in the first picture; and for a plurality of text fragments in a same column, arranging subpictures respectively corresponding to the plurality of text fragments based on an order of the plurality of text fragments in the same column.

An implementation of splitting and arranging the first picture including a plurality of columns of text is similar to an implementation of splitting and arranging the first picture including a plurality of rows of text, and details are not repeated herein again.

Figure 10:
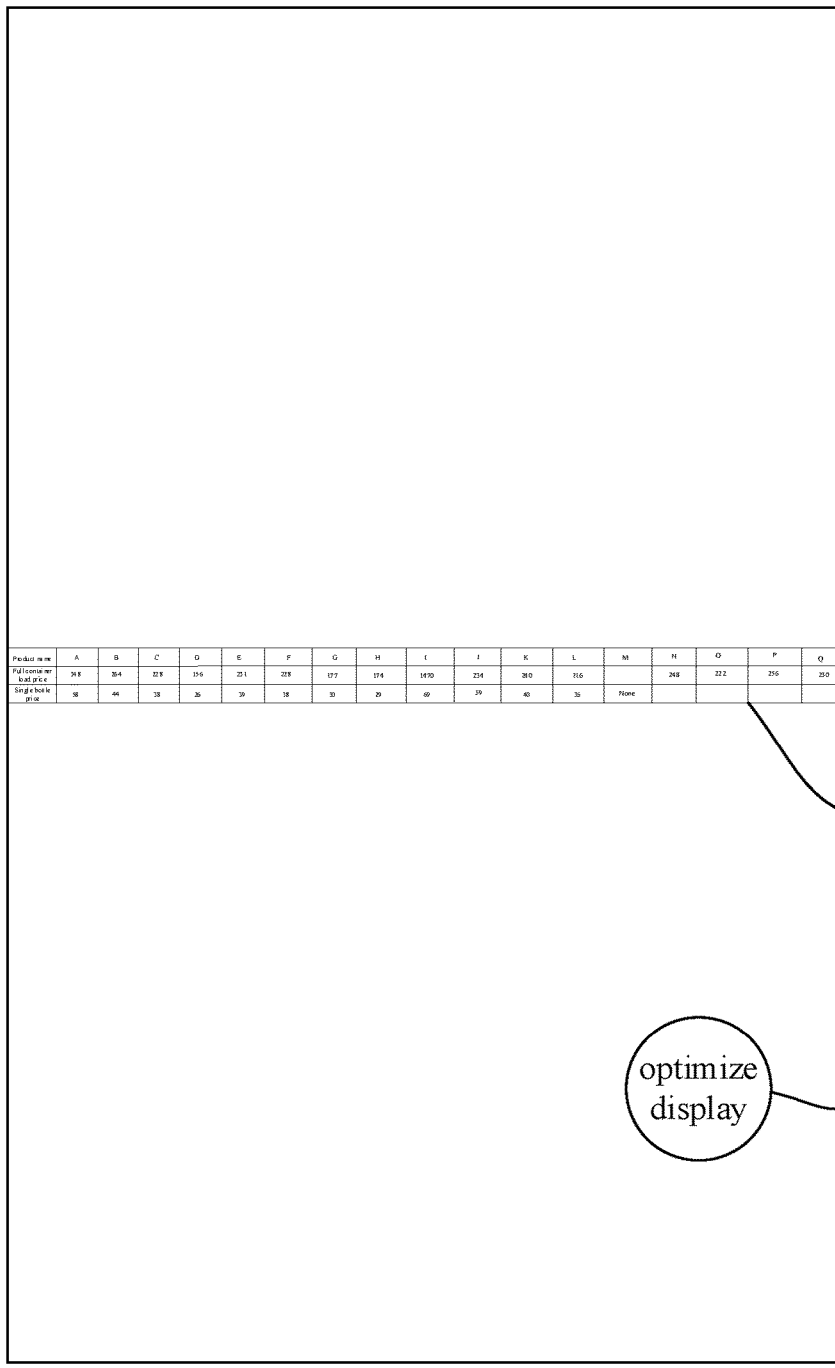
FIG. 10 is a schematic diagram of displaying a predetermined icon according to an embodiment of the present disclosure.

In one or more embodiments of the present disclosure, the picture display method further includes:
 referring to FIG. 10, in a case that the first size satisfies the predetermined condition, displaying a predetermined icon.
 Before S102, the picture display method further includes:
 receiving an input operation for the predetermined icon; and splitting the first picture to obtain at least two subpictures in response to the input operation, and obtaining the second picture based on the at least two subpictures.

In this embodiment of the present disclosure, the user may determine whether to split the picture depending on requirements thereof. If the user needs to split the picture, the predetermined icon is triggered to split the picture.

In one or more embodiments of the present disclosure, the picture display method further includes: in a case of displaying table content, taking a screenshot of the table content to obtain the first picture.

For example, in a case of identifying display of an excel table, currently displayed content is automatically read, and it is judged whether to optimize a region displaying the current content based on a length-width ratio of the region displaying the current content. If the region needs to be optimized, then the predetermined icon pops up. When an input operation for the predetermined icon is detected, a screenshot is taken for the region displaying the current content to obtain the first picture, the first picture is split, subpictures obtained from splitting are arranged, and the arranged subpictures are displayed.

In one or more embodiments of the present disclosure, the picture display method further includes: synthesizing the arranged at least two subpictures to obtain a synthesized picture; and in a case of receiving an input operation of storage for the synthesized picture, storing the synthesized picture in response to the input operation of storage.

For example, the synthesized picture is displayed after being obtained; if an input operation of returning is received, display of the synthesized picture is exited, and a prompt message is displayed to prompt the user whether to save the synthesized picture; if an input operation of saving is received, indicating that the user chooses to save the synthesized picture, the synthesized picture is stored in an album in response to the input operation of saving; and if an input operation of not saving is received, indicating that the user selects not to save the synthesized picture, the synthesized picture is automatically destroyed in response to the input operation of not saving.

The synthesized picture may be named in a manner of a name of the first picture+a split time. For example, the name of the first picture is abc.jpg, the split time of the first picture is 16:29 on May 31, 2019, and the name of the synthesized picture is abc-cut201905311629.jpg. The synthesized picture may be temporarily stored in a local file system.

In one or more embodiments of the present disclosure, the picture display method further includes: after displaying the synthesized picture, receiving an input operation of enlarging the synthesized picture; and re-splitting the first picture in response to the input operation of enlarging. For example, a value of N is increased on the basis of the quantity N of the subpictures determined last time, thereby increasing the quantity of the subpictures obtained from splitting, and the first picture is re-split according to the increased value of N.

In one or more embodiments of the present disclosure, before S104, the picture display method further includes: identifying whether there is text content in the first picture; and performing S104 in a case that the first picture is identified to have the text content. For example, when a displayed picture is detected, OCR technology is used to identify whether there is text content in the picture.

Figure 11:
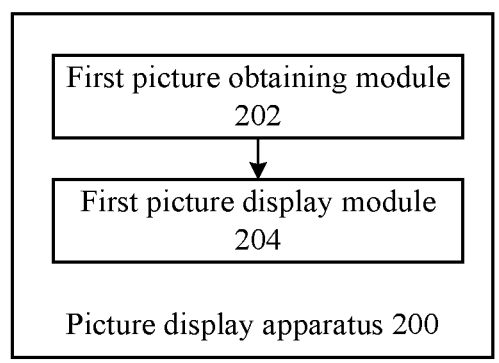
FIG. 11 is a schematic structural diagram of a picture display apparatus according to an embodiment of the present disclosure.

FIG. 11 is a schematic structural diagram of a picture display apparatus according to an embodiment. The picture display apparatus is applied to an electronic device, as shown in FIG. 11, and the picture display apparatus 200 includes:

a first picture obtaining module 202, configured to obtain a first picture, and the first picture including a first region and a second region arranged in a first direction; and a first picture display module 204, configured to display a second picture if a first size of the first picture in the first direction satisfies a predetermined condition, and the second picture including the first region and the second region arranged in a second direction.

In the embodiments of the present disclosure, for the first picture to be displayed, the first picture includes the first region and the second region arranged in the first direction; and if the first size of the first picture in the first direction satisfies the predetermined condition, the second picture is displayed, and the second picture includes the first region and the second region arranged in the second direction. The first picture is not directly displayed according to the embodiments of the present disclosure, but an arrangement mode of the first region and the second region on the first picture is changed to display the first picture. The user does not need to slide in the first direction to view the second picture, which reduces directions of the user to slide, thereby facilitating the user to view the picture and simplifying steps for the user to view the picture.

In an embodiment of the present disclosure, the first picture display module 204 is configured to display the second picture on a target screen, and at least one direction of the target screen is covered with the second picture.

In an embodiment of the present disclosure, the picture display apparatus 200 further includes:

a first picture splitting module, configured to split the first picture into at least two subpictures, the at least two subpictures including a first subpicture and a second subpicture, the first subpicture including the first region, the second subpicture including the second region, and a size of each of the subpictures in the first direction being smaller than the first size; and a picture determining module, configured to use the at least two subpictures as the second picture; or splice the at least two subpictures in the second direction to obtain the second picture.

In an embodiment of the present disclosure, the first picture splitting module includes:

a split quantity determining module, configured to determine, based on the first size, a quantity N of subpictures to be obtained from splitting, where N is a positive integer;

a first target position determining module, configured to determine a target split position based on the quantity N of the subpictures and the first size; and a first splitting submodule, configured to split the first picture at the target split position.

In an embodiment of the present disclosure, the first target position determining module includes:

a first reference position determining module, configured to determine an N equal split position of the first picture in the first direction based on the quantity N of the subpictures and the size of the first direction, and use the N equal split position as a reference split position; and a first split position determining module, configured to: in a case that there is text in the reference split position, obtain a text gap position adjacent to the text and use the text gap position as the target split position.

In an embodiment of the present disclosure, the first target position determining module includes:

a separator identification module, configured to identify a separator in the first picture;

a second reference position determining module, configured to determine an N equal split position of the first picture in the first direction based on the quantity N of the subpictures and the first size, and use the N equal split position as a reference split position; and a second split position determining module, configured to: in a case that there is a separator having a distance from the reference split position less than a first predetermined threshold, use a location of the separator as the target split position.

In an embodiment of the present disclosure, the split quantity determining module includes:
- a quotient calculation module, configured to calculate a second quotient of the first size and a size of the target screen in the first direction; and
- a quotient rounding module, configured to use a value obtained by rounding the second quotient as the quantity N of the subpictures.

In an embodiment of the present disclosure, the apparatus 200 further includes:
- a second picture splitting module, configured to split the first picture into at least two subpictures based on a preset quantity M of splits, the at least two subpictures including a first subpicture and a second subpicture, the first subpicture including the first region, the second subpicture including the second region, a size of each of the subpictures in the first direction being smaller than the first size, and M being a positive integer;
- a subpicture arrangement module, configured to arrange the at least two subpictures in the second direction;
- a picture synthesis module, configured to synthesize the at least two subpictures based on the at least two arranged subpictures to obtain a synthesized picture; and
- a re-splitting module, configured to update a value of M in a case that a size of the synthesized picture in the first direction satisfies the predetermined condition, set M=M+K, K being a positive integer, and re-split the first picture until the size of the synthesized picture does not satisfy the predetermined condition.

In an embodiment of the present disclosure, the second picture splitting module includes:
- a text identification module, configured to identify a plurality of lines or columns of text in the first picture; and
- a second splitting sub-module, configured to split the first picture into the at least two subpictures according to the plurality of lines or columns of text, where each of the subpictures includes at least one line or one column of text fragment; and the subpicture arrangement module includes:
- a first arrangement module, configured to arrange, in the second direction, subpictures respectively corresponding to the plurality of lines of text based on a line order of the text in the first picture; and for a plurality of text fragments in a same line, arrange subpictures respectively corresponding to the plurality of text fragments based on an order of the plurality of text fragments in the same line;

or the subpicture arrangement module includes:
- a second arrangement module, configured to arrange, in the second direction, subpictures respectively corresponding to the plurality of columns of text based on a column order of the text in the first picture; and for a plurality of text fragments in a same column, arrange subpictures respectively corresponding to the plurality of text fragments based on an order of the plurality of text fragments in the same column.

In an embodiment of the present disclosure, that the first size satisfies the predetermined condition includes: the first size being greater than a predetermined threshold, or a quotient of the first size and a second size of the first picture in the second direction being greater than a second predetermined threshold.

Figure 12:
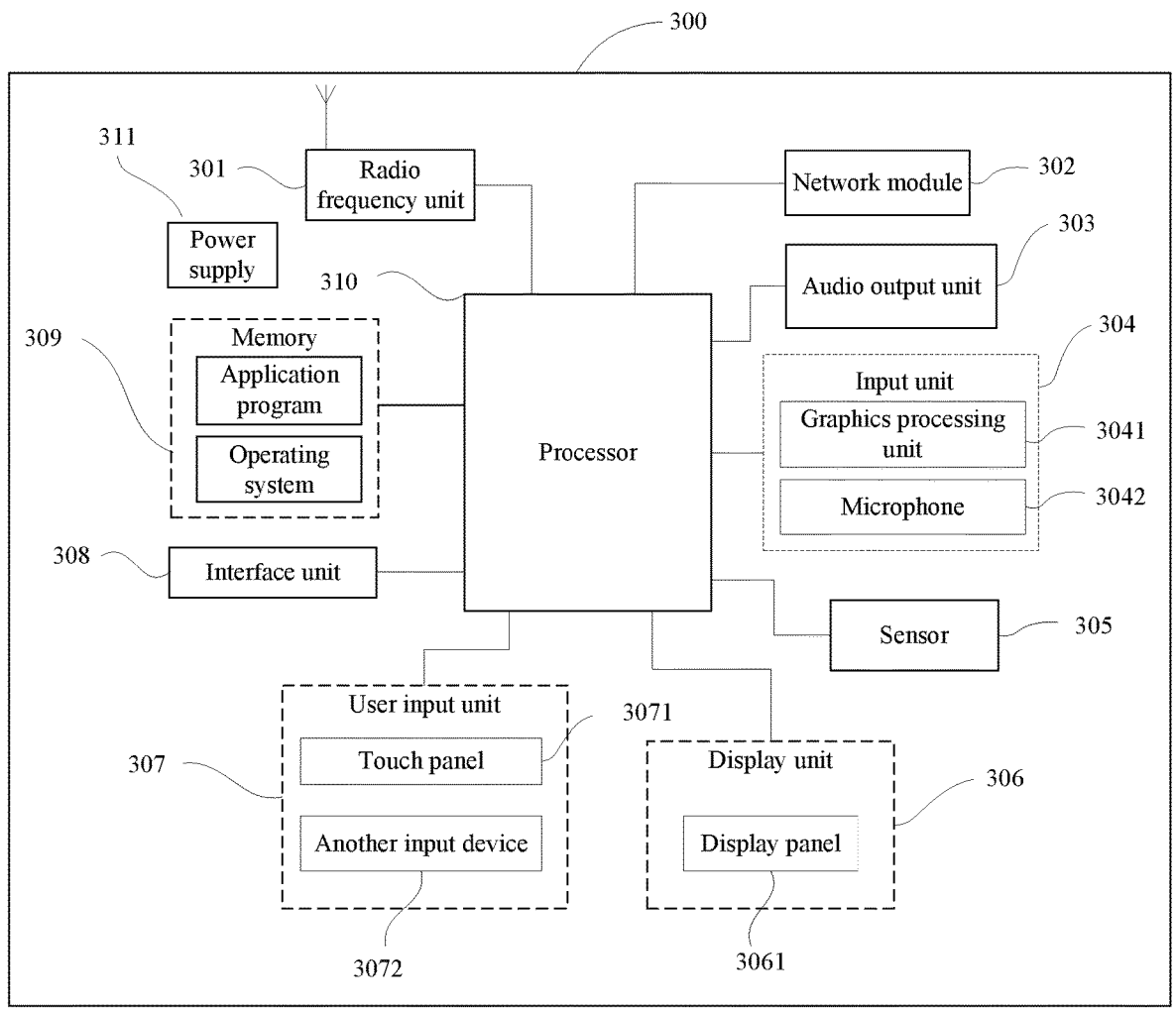
FIG. 12 is a schematic diagram of a hardware structure of an electronic device according to an embodiment of the present disclosure.

FIG. 12 is a schematic diagram of a hardware structure of an electronic device according to an embodiment of the present disclosure. The electronic device 300 includes, but not limited to: a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the electronic device shown in FIG. 12 constitutes no limitation on the electronic device. The electronic device may include more or fewer components than those shown in the figure, or a combination of some components, or an arrangement of different components. In this embodiment of the present disclosure, the electronic device includes but is not limited to a mobile phone, a tablet computer, a notebook computer, a palmtop computer, an in-vehicle terminal, a wearable device, a pedometer, and the like.

The processor 310 is configured to obtain a first picture, and the first picture includes a first region and a second region arranged in a first direction. The display module 306 is configured to display a second picture if a first size of the first picture in the first direction satisfies a predetermined condition, and the second picture includes the first region and the second region arranged in a second direction.

In the embodiments of the present disclosure, for the first picture to be displayed, the first picture includes the first region and the second region arranged in the first direction; and if the first size of the first picture in the first direction satisfies the predetermined condition, the second picture is displayed, and the second picture includes the first region and the second region arranged in the second direction. The first picture is not directly displayed according to the embodiments of the present disclosure, but an arrangement mode of the first region and the second region on the first picture is changed to display the first picture. The user does not need to slide in the first direction to view the second picture, which reduces directions of the user to slide, thereby facilitating the user to view the picture and simplifying steps for the user to view the picture.

It should be understood that in this embodiment of the present disclosure, the radio frequency unit 301 may be configured to receive and transmit information, or receive and transmit signals during a call. Specifically, the radio frequency unit 301 receives downlink data from a base station, and transmits the downlink data to the processor 310 for processing; and in addition, transmits uplink data to the base station. Generally, the radio frequency unit 301 includes but is not limited to: an antenna, at least one amplifier, a transceiver, a coupler, a low noise amplifier, a duplexer, or the like. In addition, the radio frequency unit 301 may further communicate with a network and other devices by using a wireless communication system.

The electronic device provides users with wireless broadband Internet access through the network module 302, for example, helps users receive and send e-mails, browse web pages, and access streaming media.

The audio output unit 303 may convert audio data received by the radio frequency unit 301 or the network module 302 or stored in the memory 309 to an audio signal and output the audio signal as a sound. In addition, the audio output unit 303 may further provide an audio output (for example, a call signal receiving sound and a message receiving sound) related to a specific function performed by the electronic device 300. The audio output unit 303 includes a loudspeaker, a buzzer, a receiver, or the like.

The input unit 304 is configured to receive audio or video signals. The input unit 304 may include a graphics processing unit (GPU) 3041 and a microphone 3042. The graphics processing unit 3041 is configured to process image data of a still picture or a video obtained by an image capture apparatus (for example, a camera) in a video capture mode or an image capture mode. A processed image frame may be displayed on the display unit 306. The image frame processed by the graphics processing unit 3041 may be stored in the memory 309 (or another storage medium) or sent via the radio frequency unit 301 or the network module 302. The microphone 3042 may receive a sound and can process such a sound into audio data. The processed audio data may be converted, in a phone calling mode, into a format that may be transmitted to a mobile communication base station by using the radio frequency unit 301 for output.

The electronic device 300 further includes at least one sensor 305, for example, a light sensor, a motor sensor, or another sensor. Specifically, the light sensor includes an ambient light sensor and a proximity sensor. The ambient light sensor can adjust brightness of a display panel 3061 according to ambient light brightness. The proximity sensor can switch off the display panel 3061 and/or backlight when the electronic device 300 moves close to an ear. As a motion sensor, an accelerometer sensor can detect magnitude of acceleration in various directions (usually three axes), can detect magnitude and the direction of gravity when stationary, can be configured to identify electronic device postures (such as switching between a landscape mode and a portrait mode, related games, and magnetometer posture calibration), can perform functions related to vibration identification (such as a pedometer and a knock), and the like. The sensor 305 may further include a fingerprint sensor, a pressure sensor, an iris sensor, a molecular sensor, a gyroscope, a barometer, a hygrometer, a thermometer, an infrared sensor, or the like. Details are not described herein.

The display unit 306 is configured to display information entered by a user or information provided for the user. The display unit 306 may include a display panel 3061, and the display panel 3061 may be configured in a form of a liquid crystal display (LCD), an organic light-emitting diode (OLED), or the like.

The user input unit 307 can be configured to receive entered number or character information, and generate key signal input related to user settings and function control of the electronic device. Specifically, the user input unit 307 includes a touch panel 3071 and another input device 3072. The touch panel 3071 is also referred to as a touchscreen, and may collect a touch operation performed by the user on or near the touch panel 3071 (for example, an operation performed on or near the touch panel 3071 by the user by using any appropriate object or accessory such as a finger or a stylus). The touch panel 3071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 310, and receives and executes a command from the processor 310. In addition, the touch panel 3071 may be implemented in a plurality of forms, such as a resistive type, a capacitive type, an infrared ray type or a surface acoustic wave type. In addition to the touch panel 3071, the user input unit 307 may further include another input device 3072. Specifically, the another input device 3072 may include, but is not limited to, a physical keyboard, a functional button (such as a volume control key or a power on/off key), a trackball, a mouse, and a joystick. Details are not described herein again.

Further, the touch panel 3071 may cover the display panel 3061. When detecting a touch operation on or near the touch panel 3071, the touch panel 3071 transmits the touch operation to the processor 310 to determine a type of a touch event. Then the processor 310 provides corresponding visual output on the display panel 3061 based on the type of the touch event. Although in FIG. 12, the touch panel 3071 and the display panel 3061 are configured as two independent components to implement input and output functions of the electronic device, in some embodiments, the touch panel 3071 and the display panel 3061 can be integrated to implement the input and output functions of the electronic device. Details are not limited herein.

The interface unit 308 is an interface for connecting an external apparatus and the electronic device 300. For example, the external device may include a wired or wireless headphone port, an external power supply (or a battery charger) port, a wired or wireless data port, a storage card port, a port used to connect to an apparatus having an identity module, an audio input/output (I/O) port, a video I/O port, a headset port, or the like. The interface unit 308 can be configured to receive input from an external apparatus (for example, data information and power) and transmit the received input to one or more elements in the electronic device 300, or can be configured to transmit data between the electronic device 300 and the external apparatus.

The memory 309 may be configured to store a software program and various data. The memory 309 may primarily include a program storage region and a data storage region, where the program storage region may store an operating system, an application (such as a sound playing function, an image playing function) required for at least one function, or the like; and the data storage region may store data (such as audio data, a phone book) created based on the use of a mobile phone. In addition, the memory 309 may include a high-speed random access memory, and may further include a non-volatile memory such as at least one magnetic disk storage component, a flash memory component, or another volatile solid-state storage component.

The processor 310 is a control center of the electronic device and connects all parts of the electronic device using various interfaces and circuits. By running or executing software programs and/or modules stored in the memory 309 and by calling data stored in the memory 309, the processor 310 implements various functions of the electronic device and processes data, thus performing overall monitoring on the electronic device. The processor 310 may include one or more processing units. Exemplarily, the processor 310 may be integrated with an application processor and a modem processor. The application processor mainly processes an operating system, a user interface, an application, or the like. The modem processor mainly processes wireless communication. It can be understood that, alternatively, the modem processor may not be integrated into the processor 310.

The electronic device 300 may further include the power supply 311 (for example, a battery) supplying power to various components. Exemplarily, the power supply 311 may be logically connected to the processor 310 through a power management system, so as to implement functions such as charging, discharging, and power consumption management through the power management system.

In addition, the electronic device 300 includes some functional modules not shown. Details are not described herein.

Exemplarily, an embodiment of the present disclosure further provides an electronic device, including a processor 310, a memory 309, and a computer program that is stored in the memory 309 and capable of running on the processor 310. When the processor 310 executes the computer program, the foregoing processes of the picture display method embodiment are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing picture display method embodiment are implemented, and a same technical effect can be achieved. To avoid repetition, details are not described herein again. The computer readable storage medium is, for example, a read-only memory (ROM), a random access memory (RAM), a magnetic disk, or an optical disk.

It should be noted that in this specification, the terms "comprise", "include" and any other variants thereof are intended to cover non-exclusive inclusion, so that a process, a method, an article, or an apparatus that includes a series of elements not only includes those elements, but also includes other elements not expressly listed, or also includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure. Aspects of the present disclosure are described above with reference to a flowchart and/or block diagram of a method, an apparatus (system), or a computer program product according to embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of another programmable data processing apparatus, specific functions/actions in one or more blocks in the flowcharts and/or in the block diagrams are implemented. Such a processor may be, but is not limited to a general purpose processor, a special purpose processor, an application specific processor, or a field programmable logic array. It should also be understood that each block in the block diagrams and/or flowcharts and combinations of the blocks in the block diagrams and/or flowcharts may also be implemented by a dedicated hardware-based system for executing specified functions or actions, or may be implemented by a combination of dedicated hardware and computer instructions.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection of the present disclosure.

What is claimed is:

1. A method for picture display, performed by an electronic device, the method comprising:
   splitting a first picture into at least two subpictures when a first size of the first picture in a first direction satisfies a predetermined condition, the first picture comprising a first region and a second region arranged in the first direction, the at least two subpictures comprising a first subpicture comprising the first region and a second subpicture comprising the second region; and
   displaying a second picture generated based on the at least two subpictures, the second picture comprising the first region and the second region arranged in a second direction,
   wherein splitting the first picture into at least two subpictures comprises:
      determining, based on the first size, a quantity N of subpictures to be obtained from splitting, wherein N is a positive integer;
      determining one or more equal split positions of the first picture in the first direction based on the quantity N of the subpictures and the first size of the first picture in the first direction, using the one or more equal split positions as one or more reference split positions;
      when there is a text at one of the reference split positions, using a text gap position adjacent to the text as one of target split positions; and
      splitting the first picture at the target split positions.

2. The method according to claim 1, wherein displaying the second picture comprises:
   displaying the second picture on a target screen, at least one direction of the target screen being covered with the second picture.

3. The method according to claim 1, wherein before displaying the second picture, the method further comprises:
   using the at least two subpictures as the second picture; or
   splicing the at least two subpictures in the second direction to obtain the second picture.

4. The method according to claim 1, wherein determining the one or more equal split positions of the first picture in the first direction based on the quantity N of the subpictures and the first size comprises:
   identifying at least one separator in the first picture; and
   when there is a separator having a distance from one of the reference split positions less than a first predetermined threshold, using a location of the separator as one of the target split positions.

5. The method according to claim 1, wherein determining, based on the first size, the quantity N of subpictures to be obtained from splitting comprises:
   calculating a second quotient of the first size and a size of the target screen in the first direction; and
   using a value obtained by rounding the second quotient as the quantity N of the subpictures.

6. The method according to claim 1, wherein
splitting the first picture into the at least two subpictures is based on a preset quantity M of splits, wherein the method further comprises:
arranging the at least two subpictures in the second direction;
synthesizing the at least two subpictures based on the at least two arranged subpictures to obtain a synthesized picture; and
updating a value of M when a size of the synthesized picture in the first direction satisfies the predetermined condition, setting M=M+K, K being a positive integer, and re-splitting the first picture until the size of the synthesized picture does not satisfy the predetermined condition.

7. The method according to claim 6, wherein:
splitting the first picture into at least two subpictures comprises:
identifying a plurality of lines or columns of text in the first picture; splitting the first picture into the at least two subpictures according to the plurality of lines or columns of text, wherein each of the subpictures comprises at least one line or one column of text fragment; and
arranging the at least two subpictures in the second direction comprises:
arranging, in the second direction, subpictures respectively corresponding to the plurality of lines of text based on a line order of the text in the first picture; and for a plurality of text fragments in a same line, arranging subpictures respectively corresponding to the plurality of text fragments based on an order of the plurality of text fragments in the same line;
or,
arranging, in the second direction, subpictures respectively corresponding to the plurality of columns of text based on a column order of the text in the first picture; and for a plurality of text fragments in a same column, arranging subpictures respectively corresponding to the plurality of text fragments based on an order of the plurality of text fragments in the same column.

8. The method according to claim 1, wherein the predetermined condition comprises: the first size being greater than a predetermined threshold, or a quotient of the first size and a second size of the first picture in the second direction being greater than a second predetermined threshold.

9. An electronic device, comprising: a memory, a processor, and a computer program that is stored in the memory and executable on the processor, wherein the computer program, when is executed by the processor, causes the electronic device to perform operations comprising:
splitting a first picture into at least two subpictures when a first size of the first picture in a first direction satisfies a predetermined condition, the first picture comprising a first region and a second region arranged in the first direction, the at least two subpictures comprising a first subpicture comprising the first region and a second subpicture comprising the second region; and
displaying a second picture generated based on the at least two subpictures, the second picture comprising the first region and the second region arranged in a second direction,
wherein splitting the first picture into at least two subpictures comprises:
determining, based on the first size, a quantity N of subpictures to be obtained from splitting, wherein N is a positive integer;
determining one or more equal split positions of the first picture in the first direction based on the quantity N of the subpictures and the first size of the first picture in the first direction, using the one or more equal split positions as one or more reference split positions;
when there is a text at one of the reference split positions, using a text gap position adjacent to the text as one of target split positions; and
splitting the first picture at the target split positions.

10. The electronic device according to claim 9, wherein displaying the second picture comprises:
displaying the second picture on a target screen, at least one direction of the target screen being covered with the second picture.

11. The electronic device according to claim 9, wherein before displaying the second picture, the operations further comprise:
using the at least two subpictures as the second picture; or splicing the at least two subpictures in the second direction to obtain the second picture.

12. The electronic device according to claim 9, wherein determining the one or more equal split positions of the first picture in the first direction based on the quantity N of the subpictures and the first size comprises:
identifying at least one separator in the first picture; and
when there is a separator having a distance from one of the reference split positions less than a first predetermined threshold, using a location of the separator as one of the target split positions.

13. The electronic device according to claim 9, wherein
splitting the first picture into the at least two subpictures is based on a preset quantity M of splits, wherein the operations further comprise:
arranging the at least two subpictures in the second direction;
synthesizing the at least two subpictures based on the at least two arranged subpictures to obtain a synthesized picture; and
updating a value of M when a size of the synthesized picture in the first direction satisfies the predetermined condition, setting M=M+K, K being a positive integer, and re-splitting the first picture until the size of the synthesized picture does not satisfy the predetermined condition.

14. The electronic device according to claim 13, wherein before displaying the second picture, the operations further comprise:
splitting the first picture into at least two subpictures comprises:
identifying a plurality of lines or columns of text in the first picture; splitting the first picture into the at least two subpictures according to the plurality of lines or columns of text, wherein each of the subpictures comprises at least one line or one column of text fragment; and
arranging the at least two subpictures in the second direction comprises:
arranging, in the second direction, subpictures respectively corresponding to the plurality of lines of text based on a line order of the text in the first picture; and for a plurality of text fragments in a same line, arranging subpictures respectively corresponding to the plurality of text fragments based on an order of the plurality of text fragments in the same line; or
arranging, in the second direction, subpictures respectively corresponding to the plurality of columns of text based on a column order of the text in the first picture; and for a plurality of text fragments in a same column, arranging subpictures respectively corresponding to the plurality of text fragments based on an order of the plurality of text fragments in the same column.

15. The electronic device according to claim 9, wherein the predetermined condition comprises: the first size being greater than a predetermined threshold, or a quotient of the first size and a second size of the first picture in the second direction being greater than a second predetermined threshold.

16. A non-transitory computer-readable storage medium, storing a computer program, when executed by a processor, implements a picture display method, the method comprising:

splitting a first picture into at least two subpictures when a first size of the first picture in a first direction satisfies a predetermined condition, the first picture comprising a first region and a second region arranged in the first direction, the at least two subpictures comprising a first subpicture comprising the first region and a second subpicture comprising the second region; and displaying a second picture generated based on the at least two subpictures, the second picture comprising the first region and the second region arranged in a second direction, wherein splitting the first picture into at least two subpictures comprises:

determining, based on the first size, a quantity N of subpictures to be obtained from splitting, wherein N is a positive integer;

determining one or more equal split positions of the first picture in the first direction based on the quantity N of the subpictures and the first size of the first picture in the first direction, using the one or more equal split positions as one or more reference split positions;

when there is a text at one of the reference split positions, using a text gap position adjacent to the text as one of target split positions; and splitting the first picture at the target split positions.

* * * * *